Dec. 16, 1952     J. DYKSTRA     2,621,955
COMBINATION FRONT BUMPER AND GRILLE
Filed Dec. 31, 1949     3 Sheets-Sheet 1

Inventor
James Dykstra
By Willits, Helwig & Baillie
Attorneys

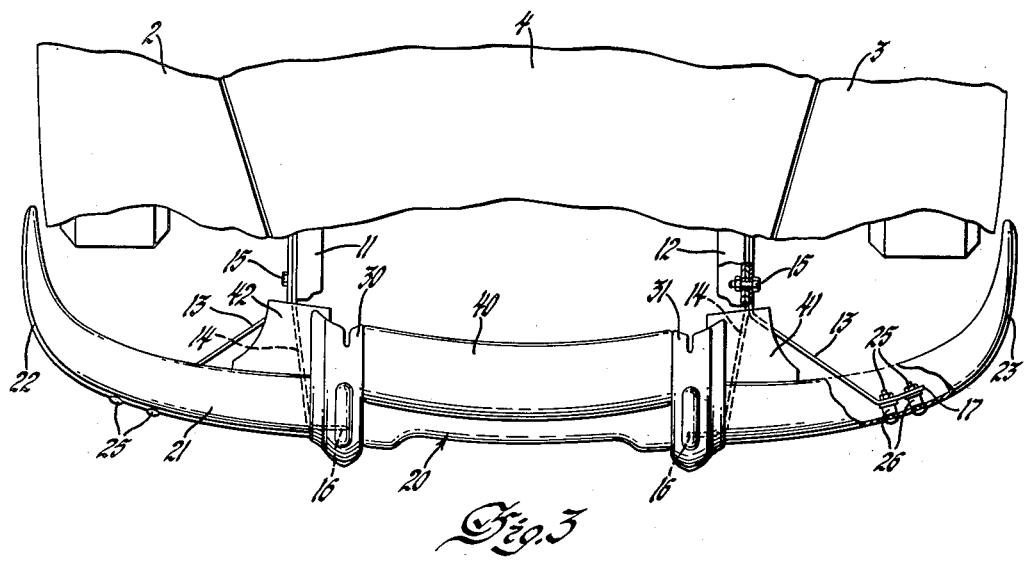
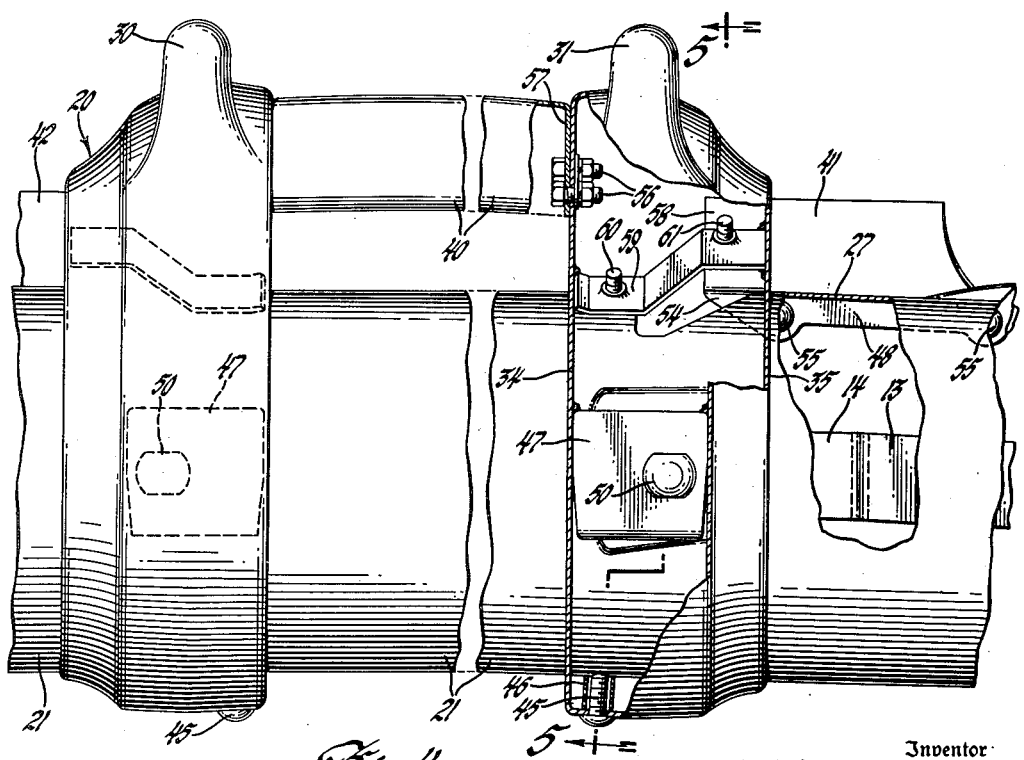

Dec. 16, 1952  J. DYKSTRA  2,621,955
COMBINATION FRONT BUMPER AND GRILLE
Filed Dec. 31, 1949  3 Sheets-Sheet 3

Inventor
James Dykstra
By Willito, Helwig & Baillio
Attorney

Patented Dec. 16, 1952

2,621,955

UNITED STATES PATENT OFFICE 2,621,955

COMBINATION FRONT BUMPER AND GRILLE

James Dykstra, Lansing, Mich., assignor to General Motors Corporation, Detroit, Mich., a corporation of Delaware Application December 31, 1949, Serial No. 136,228

4 Claims. (Cl. 293—63)

This invention relates to motor vehicles and particularly to an end construction therefor comprising a combined bumper and air intake grille.

The conventional practice prior to my invention, particularly on automobiles having a forwardly mounted engine receiving its cooling air supply through an opening in the forward wall in the body sheet metal, has been to provide a grille structure for the air intake opening fixedly secured to the body sheet metal and a transverse bumper separately supported on relatively long resilient arms from the vehicle frame in a position forwardly of the grille. By reason of the bumper being mounted separately from the grille its movement relative thereto on the occasions of vehicle collisions frequently results in the bumper coming in contact with and damaging the grille.

Further in an attempt to insure against projecting portions of other vehicles, et cetera extending over or under the bumper and striking the grille on the occasions of minor collisions, various extensions or "bumper guards" have been attached to the bumper bar to provide the same with a widened section opposite the grille. It frequently happens, however, that upon one of these bumper guards receiving a substantial blow the bumper bar and its supporting structure twists sufficiently for the guard itself to strike the grille, thereby causing damage which would not have occurred in the absence of such bumper guards.

While attempts have been made in the prior art to avoid these difficulties, such as by forming the main impact bar with a perforated section to serve as a grille in place of the usual separate grille attached to the body sheet metal, the results have been unsatisfactory either by reason of the excessive cost of the construction employed and/or the excessive weight of such bumper-grilles if they are to have a sufficiently large total opening area to meet the requirements of adequate ventilation and cooling of the vehicle in operation.

It is, therefore, the principal object of the instant invention to provide an improved end construction for an automotive vehicle including a lightweight bumper-grille assembly of low cost and adequate strength, the individual parts of which are removably fixed together for convenience in repair and replacement.

A more specific object of the invention is to provide such a vehicle end construction incorporating a single primary bumper bar to which are rigidly attached a pair of upright members in a laterally spaced apart relation whose upper ends are interconnected by a secondary bumper bar cooperating therewith to form a grille for the engine cooling air opening in the end wall of the vehicle.

These and other objects attained by my invention will be clearly understood from the following description having reference to the drawings wherein:

Figure 3 is a sectional plan view taken substantially on line 3—3 of Figure 2.

Figure 4 is an enlargement of a portion of my bumper grille as viewed in Figure 2, with parts broken away and in section.

Figure 1:
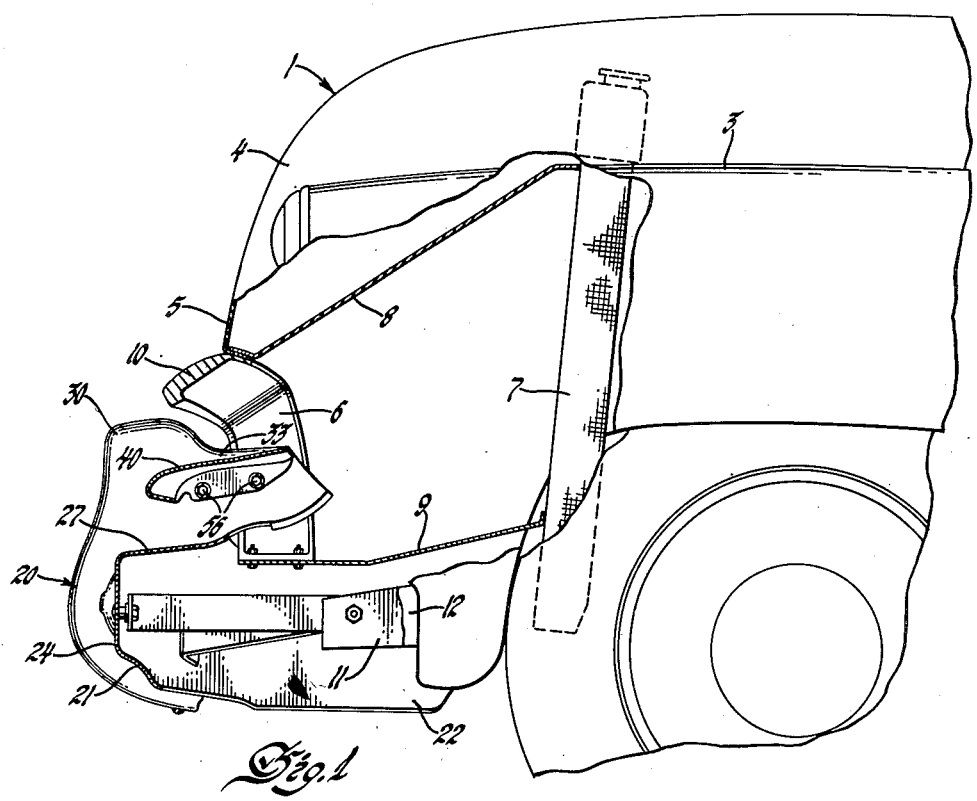
Figure 1 is a partially diagrammatic view in side elevation of an automotive vehicle incorporating the bumper-grille structure of my invention, with parts broken away and in section.

Referring to the drawings, the numeral 1 designates generally the body of an automotive vehicle having a forwardly mounted engine (not shown) disposed between fenders 2 and 3 and covered by a hood 4. The fenders and the hood turn downwardly in conventional manner at their forward ends to cooperate in forming a body front end wall designated generally at 5 having a central opening 6 through which air for cooling the engine is taken in during vehicle operation. This cooling air is conducted from the intake opening 6 to the engine radiator 7 through a duct or passage formed by upper and lower panels 8 and 9 (Figure 1) and suitable connecting side panels (not shown). The top and side extremities of the air intake opening are framed by an inverted generally U-shaped molding 10 (Figures 1 and 2) which is fixedly attached to the body 1 in any desired manner. 11 and 12 indicate the forward ends of the usual longitudinal sills of the vehicle frame upon which the body 1 is mounted and extending forwardly therefrom in laterally divergent relation on each side of the opening 6 is a pair of spring steel bumper supporting arms 13 and 14. These arms are fixedly attached to the sills 11 and 12 in the usual manner as by bolts 15 and have their forward ends 16 and 17 turned outwardly from each other respectively to provide mounting pads for my bumper-grille structure which is designated generally by the numeral 20. The angular relation of the arms 13 and 14 to the sills 11 and 12 allows the arms to yield somewhat under impact loads imposed on the bumper-grille 20.

Figure 2:
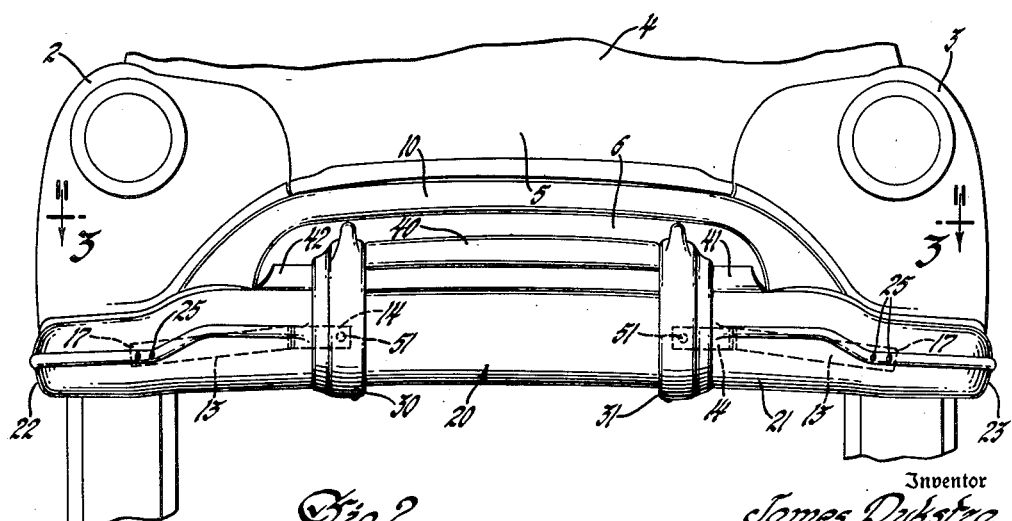
Figure 2 is a front elevational view of the vehicle and bumper-grille of Figure 1.
Figure 5:
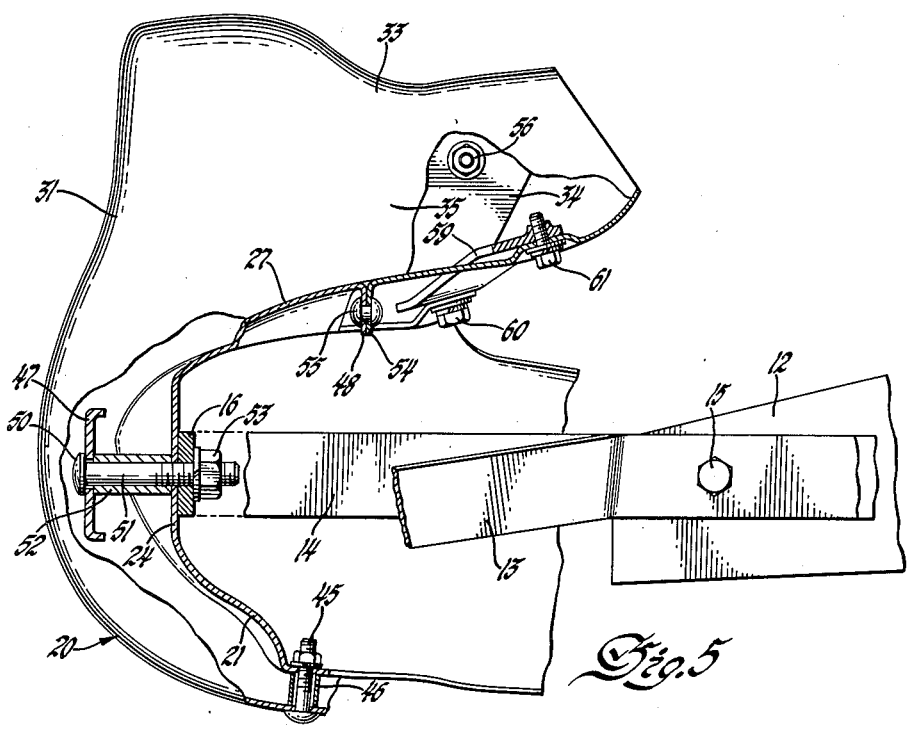
Figure 5 is a sectional view taken substantially on line 5—5 of Figure 4.

As shown in Figures 2 and 3 the bumper-grille structure 20 comprises a single primary impact bar 21 extending the full width of the body 1 and curving rearwardly around the same at its opposite ends 22 and 23. The bar 21 is of channel section (Figures 1 and 5), the channel being open toward the body, and has its web portion 24 removably fixed to the ends 17 of the arms 13 by bolts 25. 26 are spacers between the arm ends 17 and the web section 24. As will be seen in Figure 1, the primary bar 21 has its upper channel section flange 27 disposed substantially at the height of the panel 9.

Secured to the primary bar 21 opposite the air intake opening 6 are two laterally spaced apart vertical bars or stanchions 30 and 31 each of which is generally C-shaped as viewed in side elevation (Figures 1 and 5) to receive the channel section primary bar 21 in nesting relation and its upwardly and rearwardly extending portion 33 terminates within the opening 6 defined by the molding 10. Each of the stanchions 30 and 31 is of channel section open toward the primary bar 21, and flange portions 34 and 35 closely conform and abut edgewise with the contour of the primary bar external surface. Interconnecting the upper portions 33 of the stanchions is a secondary bumper bar or tie bar 40 which as seen in Figure 1 is disposed substantially within the opening 6 and approximately equally spaced vertically from the primary bar 21 and the molding 10.

As will be seen in Figure 2, the stanchions 30 and 31 are disposed a short distance laterally inward from the respective ends of the opening 6, and between the stanchions and said ends of the opening are shown ear-like plates 41 and 42 respectively, which serve to conceal the bumper supporting arms 13 and 14 from external view. Preferably the primary impact bar 21, stanchions 30 and 31, and tie bar 40 are removably connected together by means of bolts to provide for the replacement of individual parts in the event of damage. The lower ends of the stanchions are each secured to the primary bar 21 by a single bolt 45 which passes through a short spacer member 46 separating the web of the stanchion and the lower flange of the primary bar 21. Opposite the bent-over ends 16 of the arms 14 each stanchion is provided interiorly with an apertured plate 47 which is welded as at 49 to the stanchion flanges 34 and 35. This plate 47 serves as an abutment for the head 50 of a bolt 51 which anchors the stanchion to the primary bar 21 and the bar 21 to the arm end 16, a spacer 52 being provided to take the thrust of the bolt 51 when the nut 53 is drawn up.

Figure 6:
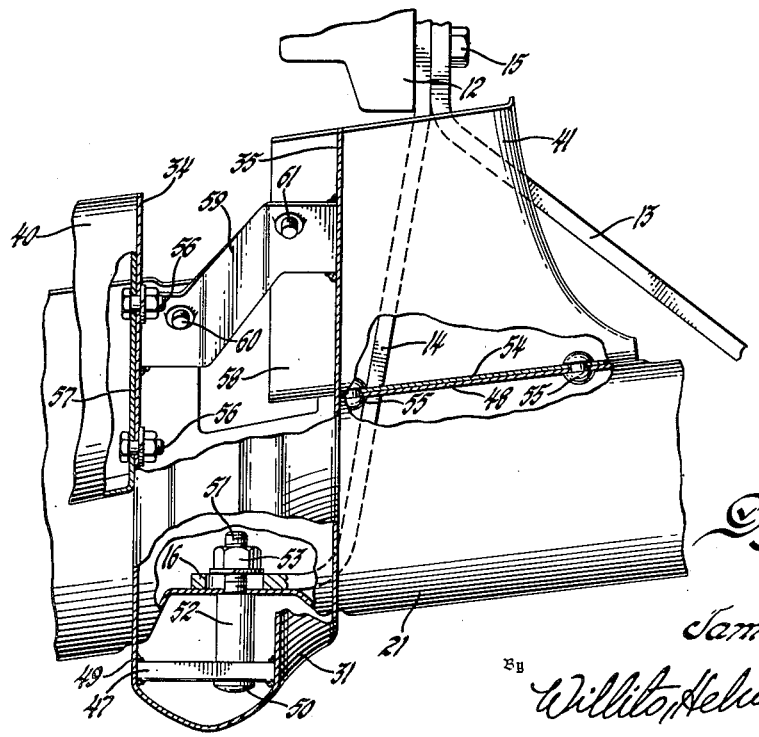
Figure 6 is an enlarged fragmentary view similar to Figure 3, with parts broken away and in section.

Each of the ear-like plates 41 and 42 has a downwardly turned flange 54 which abuts a cooperating turned down portion 48 provided on the upper channel section flange 27 of the primary bar and is secured thereto by rivets 55. The inboard flange 34 of each stanchion is secured by bolts 56 to the flanged end 57 of the tie bar 40 (Figures 4, 5 and 6) and the inboard end 58 of each plate 41 and 42 is connected to the upper channel section flange 27 of the impact bar 21 by means of a strap 59 whose opposite ends are provided with tapped openings to receive bolts 60 and 61 extending through suitable apertures in the flange 27 and plate end 58.

From the description heretofore given it is believed apparent that a novel and commercially practical grille structure is provided for the air intake opening in the front end wall of the vehicle which accommodates fore and aft movement of the bumper during collisions. While I have shown but one tie bar 40 interconnecting the stanchions 30 and 31, the number of such bars used would of course vary with the size of the opening 6.

I claim:

1. In an automotive vehicle having a frame with a body mounted thereon and terminating in an end wall having a central opening adjacent its lower margin for intake of engine cooling air, the combination therewith of a transverse bumper bar of outwardly closed channel section having its end portions embracing opposite sides of the body and its intermediate portion disposed opposite the lower margin of said opening, a pair of resilient arms extending in laterally divergent relation from the frame to the bumper bar on opposite sides of said opening for supporting and cushioning the bumper bar against impacts directed longitudinally of the vehicle, said arms being fixedly connected at their respective opposite ends to the frame and the channel section web of the bumper bar, a pair of vertical bars clamped to said bumper bar intermediate portion adjacent and laterally inward of the respective side margins of the opening, said vertical bars each having a generally C-shaped lower portion receiving the bumper bar channel section in nesting relation and an upper portion extending toward the body and terminating within the opening, and a transverse tie bar interconnecting the upper portions of the vertical bars and spaced intermediately of the bumper bar and the upper margin of the opening.

2. In an automotive vehicle, an engine, a coolant radiator therefor, a body including an engine compartment having a forward end wall provided with an opening centrally located adjacent its lower margin and other walls forming a passage rearwardly from said opening to the radiator, a generally U-shaped decorative molding outlining the upper and lateral extremities of said opening, said molding being fixed rigidly to the body, a frame fixedly supporting said walls, a combined bumper and grille structure in protective relation with said end wall, and resilient means interconnecting the bumper and frame and yieldably accommodating their relative movement longitudinally of the vehicle, said bumper and grille structure comprising upper and lower transverse bars interconnected by spaced-apart vertical bars, said lower transverse bar extending the full width of the end wall, said upper transverse bar and its associated portions of the vertical bars being receivable by said opening during movement of the lower transverse bar toward the frame.

3. In a motor vehicle, in combination with a frame having a body mounted thereon, said body having a central opening at one end for the admission of cooling air to the engine, of a primary impact member positioned adjacent said end opening and extending transversely of the vehicle, a generally U-shaped molding fixedly secured to the body and defining the upper and lateral extremities of said opening, secondary upright impact members removably attached to said primary member in laterally spaced relation, said secondary members being positioned adjacent the lower edges and laterally inward of the side walls of said molding so as to be capable of movement through said opening without contacting said side walls of the body, a transversely positioned member extending between said secondary members and connecting the same, resilient arms mounted on said frame and secured to said primary member, and cover means overlying said resilient arms and secured to said primary member and one of said secondary members for concealing said arms from normal view, said covering means being positioned within said central opening adjacent its lower side edge.

4. In an automotive vehicle having a frame with a body mounted thereon and terminating in an end wall having a central opening adjacent its lower margin for intake of engine cooling air, the combination therewith of a primary impact bar of outwardly closed channel section extending transversely the full width of the body and defining the lower margin of said opening, a pair of resilient arms extending between the frame and said primary impact bar for supporting and cushioning said primary impact bar under impacts directed longitudinally of the vehicle, a generally U-shaped decorative molding outlining the upper and lateral extremities of said opening fixed rigidly to the body, a pair of vertical impact bars of outwardly presenting channel section and generally C-shaped in vertical plane longitudinally of the vehicle, said vertical bars receiving the primary impact bar in nested relation and terminating upwardly thereof within said opening and below said upper margin, a second transversely extending impact bar vertically spaced between said primary impact bar and said upper margin, opposite ends of said secondary bar having flanges abutting and bolted to the inboard channel walls of said vertical bars, and plates piercing the outboard channel walls of said vertical bars and extending toward the lateral margins of said opening for concealing said resilient arms from normal external view.

JAMES DYKSTRA.

REFERENCES CITED

The following references are of record in the file of this patent:

UNITED STATES PATENTS

| Number | Name | Date |
| --- | --- | --- |
| D. 125,007 | Walker | Feb. 4, 1941 |
| 2,194,459 | Frank | Mar. 26, 1940 |
| 2,250,565 | Bahr | July 29, 1941 |
| 2,329,874 | Cadwallader et al. | Sept. 21, 1943 |